United States Patent [19]

Siebeck

[11] 4,291,381

[45] Sep. 22, 1981

[54] PROCESS FOR RUNNING WIDTH ADJUSTMENT

[75] Inventor: Helmut Siebeck, Berlin, Fed. Rep. of Germany

[73] Assignee: H. Berthold, AG., Berlin, Fed. Rep. of Germany

[21] Appl. No.: 66,097

[22] Filed: Aug. 13, 1979

[30] Foreign Application Priority Data

Aug. 16, 1978 [DE] Fed. Rep. of Germany ....... 2836317

[51] Int. Cl.³ .............................................. G06F 15/20

[52] U.S. Cl. ......................................... 365/523; 354/8

[58] Field of Search ........................ 364/523, 200, 900; 354/5-8, 12, 13

[56] References Cited

U.S. PATENT DOCUMENTS

| | | | |
|---|---|---|---|
| 3,234,363 | 2/1966 | Garth, Jr. et al. | 364/523 |
| 3,668,376 | 6/1972 | Murata et al. | 364/523 |
| 3,712,443 | 1/1973 | Mathews | 354/8 X |
| 3,946,407 | 3/1976 | Ishii et al. | 354/6 |

*Primary Examiner*—Jerry Smith

*Attorney, Agent, or Firm*—Andrus, Sceales, Starke & Sawall

[57] ABSTRACT

A process for running width adjustment of adjacently positioned characters reduces the spacing of certain characters to enhance the visual impression of composed text. The process classifies the letter and symbols of the font into a plurality of groups according to their suitability for running width adjustment. The amount of running width adjustment to be provided for each pair of adjacent characters is established in accordance with their grouping. During composing, the running width of each character is determined. The characters are classified into the groups. The amount of adjustment to be provided is ascertained by reference to the group of the first character and the group of the second character of each adjacent pair and applied to the running width of one of the characters to reduce the spacing.

10 Claims, 4 Drawing Figures

*Fig. 2*

| 1ST CHARACTER ↓ / 2ND CHARACTER → | AÄ | KXZ | FP | L | OÖø | T | V | W | Y | adegmn opqsxz | rvwy | ç | hk | •,” | — | *,”‘‘ |
|---|---|---|---|---|---|---|---|---|---|---|---|---|---|---|---|---|
| AÄ | | | | | 1 | 3 | 2 | 2 | 5 | | | | | | 1 | 4 |
| KXZ | | | | | 2 | | | | | | | | | | 3 | |
| FP | 4 | | | | 1 | | | | | | | | | 8 | | |
| L | | | | | 5 | 6 | 6 | 6 | | | | | | | | |
| OÖø | 2 | | | | | 3 | 1 | 1 | 9 | | | | | 2 | | |
| T | 4 | | | | 3 | | | | 3 | | | | | 6 | 5 | |
| V | 2 | | | | 1 | | | | | 4 | 4 | 4 | | 3 | 1 | |
| W | 2 | | | | 1 | | | | | | | | | 3 | 1 | |
| Y | 5 | | | | 4 | | | | | 2 | 2 | 2 | | 8 | 4 | |
| adegmn opqsxz | | | | | | | | | | 4 | 4 | 4 | | | | |
| rvwy | | | | | | | | | | | | | | 3 | | |
| ç | | | | | | | | | | | | | 2 | | | |
| hk | | | | | | | | | | | | | | | | |
| •,” | | | | | | 7 | 7 | 6 | 8 | | | | | | | |
| — | 1 | | | | | 3 | 2 | 1 | 3 | | | | | | | |
| *,”‘‘ | 6 | | | | 2 | | | | | | | | | | | |

*Fig. 3*

VOYAGE TO TOKYO

VOYAGE TO TOKYO

PROCESS FOR RUNNING WIDTH ADJUSTMENT

The present invention relates to a process for the running width adjustment of adjacently positioned letters or similar symbols in a photocomposing machine.

Generally in type composing, and also in photocomposing, each symbol, for example, each letter, is denominated by its own defined width or thickness. With the setting of a plurality of letters in adjacency, the thickness and the type size determines the running width of the type medium. With lead type, the thickness corresponds to the width of the lead letter, while with photocomposing, the thickness either is obtainable through a corresponding coefficient register after scanning an address of the particular symbol is obtainable or is given directly with simpler machines on the symbol carrier, for example, in the form of a mark for each symbol. In lead type the thickness is preferably indicated as character thickness, while in photocomposing, the running width is referred to, which is greater, for example, for the letter "W" than for the letter "I", whereby a plurality of intermediate thicknesses occur for other letters according to the type face. The running width is computed as the product of the thickness times the type size. The thickness is, however, the base value of the running width that is established with the formation of a particular type face. From the requirement that each character must be mutally combined with others of the type face under consideration, there necessarily results for the running width of the individual symbols, a compromise for the establishment of the thickness value.

The fact alone, that different symbols occupy different widths, is however not enough to sufficiently form a font visually harmonious and proportional since with the stringing together a different impression results visually, for example, for the letters "V" and "W" than with the letter combination "V" and "A". The resulting visual spacing of the first designated combination of the letters "V" and "W" is, in many cases avoided with lead type in that a defined region is filed off the lead letters so that the letter combination moves visually nearer "VA". This process of so-called running width adjustment can be performed simply with pure electronic means in photocomposing.

Known equipment for setting of numbers and letters has a plurality of symbols, means establishing selected symbols at a predetermined location, a recording medium for the recording of the symbols and means for moving the symbols and the recording medium relative to each other, after which a symbol is recorded on the recording medium, (DE-OS No. 26 12 815). It is already known to actuate an apparatus for the specific establishment of selected symbols at a predetermined location through a keyboard in the course of which the means for moving the symbols and recording medium relative to each other is controlled through a computer. The computer is programmed in such a manner that two symbols arranged adjacent to each other in the recording medium are identified and that the means for moving the symbols and recording medium relative to each other is so controlled that proportionate spacing between the symbols is produced.

Basically, however, the unsolved problem remains of supplying the letters and characters to a selection apparatus for the determination of a running width adjustment such as a computer, or the like, so that with the concurrence of two specific so-called paracritical characters, the base thickness of the first character in the setting sequence is adjusted with a reduction value. According to the state of the art and its attendant formulation, this problem is outside any clear teaching of a technical treatment for a solution.

In the known apparatus it is particularly disadvantageous that every symbol must have as many different thickness values as there are symbols present. Under the hypothesis that approximately 110 to 130 characters, that is different symbols, belong to a normal composition, this means that a combination table or matrix must contain on an average of 120 times 120 or 14,400 memory places. Further, this matrix would then be usable only with a single type face. Thus, a very large storage capacity is necessary to which the computer must be programmed or there results, for the user of the composing machine, a table of such an extent that it is visually incomprehensible. Its use becomes practically impossible.

In these circumstances, there may be employed the present invention, which has as its object to improve a process of the known type and to further make possible an automatic running width adjustment with minimal storage capacity and correspondingly high interrogation speed. The person setting the type need exert no special attention during the setting process so that, in the last analysis, the setting production can be increased.

The solution of this problem is inventively achieved through the features set forth in the characterizing portion of the main claim.

Advantageous additional forms and embodiments of the inventive solution appear in the dependent claims.

The process of the present invention has the advantage that the typesetter with the setting of a sequence of symbols is no longer required, as before, to effect through manual intervention in the setting process, a specific undercutting, as a return transport between a letters combination, as for example, the letters "L" and "T" and thus be subject to the highest levels of concentration and attention. Rather, this now results fully automatically through storage electronics with the most minimal effort. The electronic operation characterizing the present invention is contrasted to the above mentioned, known processes, having a computer by which the combination of all symbols with all others in a type face must be made available, in that it is substantially less complex and the interrogation time is thus considerably shorter. With the concurrence of two specific paracritical character combinations, the base thickness of the first character in the setting process is acted upon with a reduction value. Contrary to the known manual process, it offers an advantageous solution as it is no longer required, with the appearance of this or each critical combination, that the typesetter reduce the running width of the character according to its arbitrary amount. This leads to an exact process reproduceable at will. The running widths or thicknesses are, according to the above described process, not tabularly determined but are calculatable in a simple manner. In the calculation method of the present invention, a stored value of the base thickness occurs, in a matrix or table, which requires merely 126 storage spaces and in which only the so-called paracritical characters or symbols find significance, that is, those symbols which with specific combinations apparently require a greater width when they are combined with thinner characters.

The invention is hereinafter exemplary described with the aid of the accompanying drawing. The drawings show:

FIG. 2 is a representation of the matrix for the distribution of the symbols of a typefont for the automatic running width adjustment;

FIG. 3 is the result of type setting according to the process of the invention (lower line) compared to a typesetting result without running width adjustment (upper line)

The generally customary process technique according to which modern photocomposing machines work is of interest here only insofar as it is necessary for the overall understanding of running width adjustment incorporated in the process. The entry of a character or similar symbol through the pressing of a keyboard initiates the scanning of an address belonging to the symbol with simultaneous interrogation and assignment of a base thickness corresponding to the selected typeface and a coefficient corresponding to the type size. The product of these quantities produces the absolute width or running width.

This value then corresponds to the actual space requirement of the character in a line; it can either be stored for a further computation of line length and/or be utilized for the transport of the recording carrier.

Figure 1:
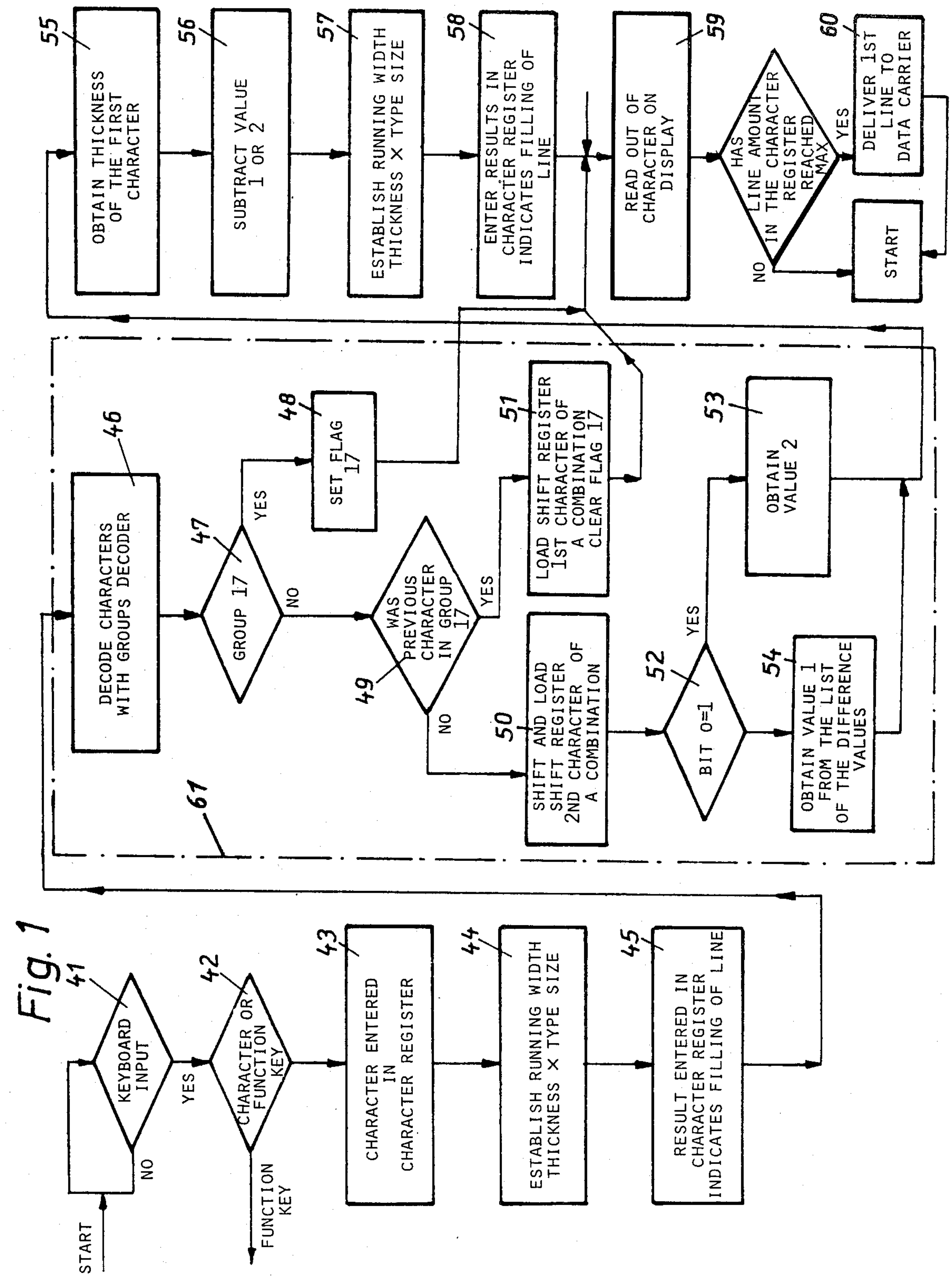
FIG. 1 is a schematic diagram showing the operation of a photocomposing machine with, in addition, the electronic circuit elements rendering possible the process according to the present invention.

FIG. 1 shows the functional flow chart of a photocomposing machine with automatic running width adjustment according to the invention. Through the depressing of a specified symbol keyboard and through the keyboard input 41 and the therewith predetermined character or symbol code 42, the particular encoded data of the character are provided in a character register 43 in the manner such that the data resulting from the key pressing is initially examined as to whether it refers to a character or a function control. This examination can be undertaken with a stored tabulation or also in that the keyboard already offers two code groups in the keying code, for example, a character code and a function key code. The subsequent processing of the function key codes, as for example, a character cancellation, the control of a line end and the line beginning or the like, is of no further interest in the process under consideration and is not further referred to here.

After the character code has been provided in the character register 43, the actual running width of the character is computed in a multiplier element 44, in which the product of the thickness times the type size is formed. For each character of a typeface the particular thickness values of the characters are preferably exchangeably stored in the photocomposing machine. The result of the multiplication process is then entered in the character register 45 and simultaneously supplied to an adjusting apparatus, not here disclosed, for the determination of the length of the line and the justification of the line.

The results, that is, the value stored in the character register 45, is supplied to a circuit 61, which renders possible the present process and which will be further explained in connection with FIG. 4. In the schematic diagram according to FIG. 1, the process sequence is so shown that the character code of the character register 45 is connected through the groups decoder 46. There the opportunity is provided to ascertain whether the character belongs to a group which does not participate in the running width adjustment, here given as group 17 in block 47. If this circumstance is answered with "yes", data is specified by 48, so that the succeeding character is always considered as the first character of a character combination. If in logic circuit 47 it is established that the character under consideration does not belong to the group 17, that is, is of a group that participates in the running width adjustment, then it is further examined in block 49, as to whether the preceding character belongs to the group 17 or not. Again a "yes-no" decision is possible. This divides the further transmission of the data into two paths, namely a shift register 50 in which is provided, in each case, the second character of a combination, and a shift register 51, that is loaded in each case with the first character of the combination in the printing sequence under simultaneous clearing of the data in the logic element 48.

In regard to further details, the diagram according to FIG. 1 is explicitly referred to at this point. In the block diagram, the running width of the first character of a character combination is newly determined by 57 and 58 and entered in the character register. Thereupon, the readout of the character on a display 59, and that of the respective ultimately provided character can result. Further, the number of lines in the character register is determined and with the attainment of a maximum number, a line is transmitted in a data carrier or a lighting element 60, that is similarly schematically shown in FIG. 1.

The gist of the present invention, namely the element 61 in FIG. 1, is additionally more particularly illustrated with the aid of FIGS. 2 through 4 and hereinafter described.

As stated at the outset, with the concurrence of so-called paracritical character combinations, the typesetter was, up till now, forced to intervene in the operating sequence if a running width adjustment was to be manually undertaken or, the adjustment was undertaken by means of a calculator, which made it possible to combine each character with each other character. According to FIG. 2, the entirety of the characters or symbols of a type size is divided in 17 groups. To the groups 1 through 16, the different characteristics necessary for the difference values of the running width adjustment are assigned. Group 17 contains those characters which do not participate in the running width adjustment.

The individual character groups are arranged in lines and rows, as shown in FIG. 2, so that a matrix of 16 times 16 rows and lines results. The groups in the rows 1 through 16 of the matrix contain the first character in the setting sequence of a paracritical character combination. The groups over the columns 1 through 16 of the matrix in each case contain the second character of the character combination. The values given in the matrix at the intersection between rows and lines thus give the differentiating amounts by which the actual thickness of the first character is, in each case, diminished. In FIG. 2, each empty space stands for a difference value of zero, that is, that with character combinations in these spaces no running width adjustment results and is necessary. FIG. 2 shows an example for the typeface "Akzidenz-Grotesk".

FIG. 3 shows an example of a text sample in which so-called paracritical combinations occur in much repeated fashion. The first, upper example would be set in a photocomposing machine without the use of the process according to the invention. One can appreciate immediately, even without typographical knowledge, that the general impression of the word is irregular, particularly through the large spaces between the letters "VO", "OY", "YA", and "TO".

The lower portion of the same example would be provided by the photocomposing machine with the process of the invention.

With the word "VOYAGE" one would perceive that, to begin with, "VO" belongs to a critical combination of the groups 1 through 16 and according to the list of FIG. 2, for "V" to "O" a difference value of 1 must be removed from the thickness of "V". Thereafter, it would be appreciated that the combination "OY" is a critical one, so that the thickness of the "O" must be reduced by the value 9.

The result after the scanning of this word in comparison to the first text portion shows a distinctly narrower stringing together of the individual letters so that now an optimal overall impression arises.

With the aid of FIG. 2, an example for illustration is considered about the intersection of the character group is the matrix-row which contains "V" and the character group is the matrix column which contains "a" so that in the space of the intersection the value 4 results. That means, that the thickness of the character "V" is diminished by the value 4 and that also the running width adjustment is affected by the value 4, which forms a measure for the difference between "V" and "a". Correspondingly then, the difference value for the example in FIG. 3 can be produced from the division of the groups according to FIG. 2.

Figure 4:
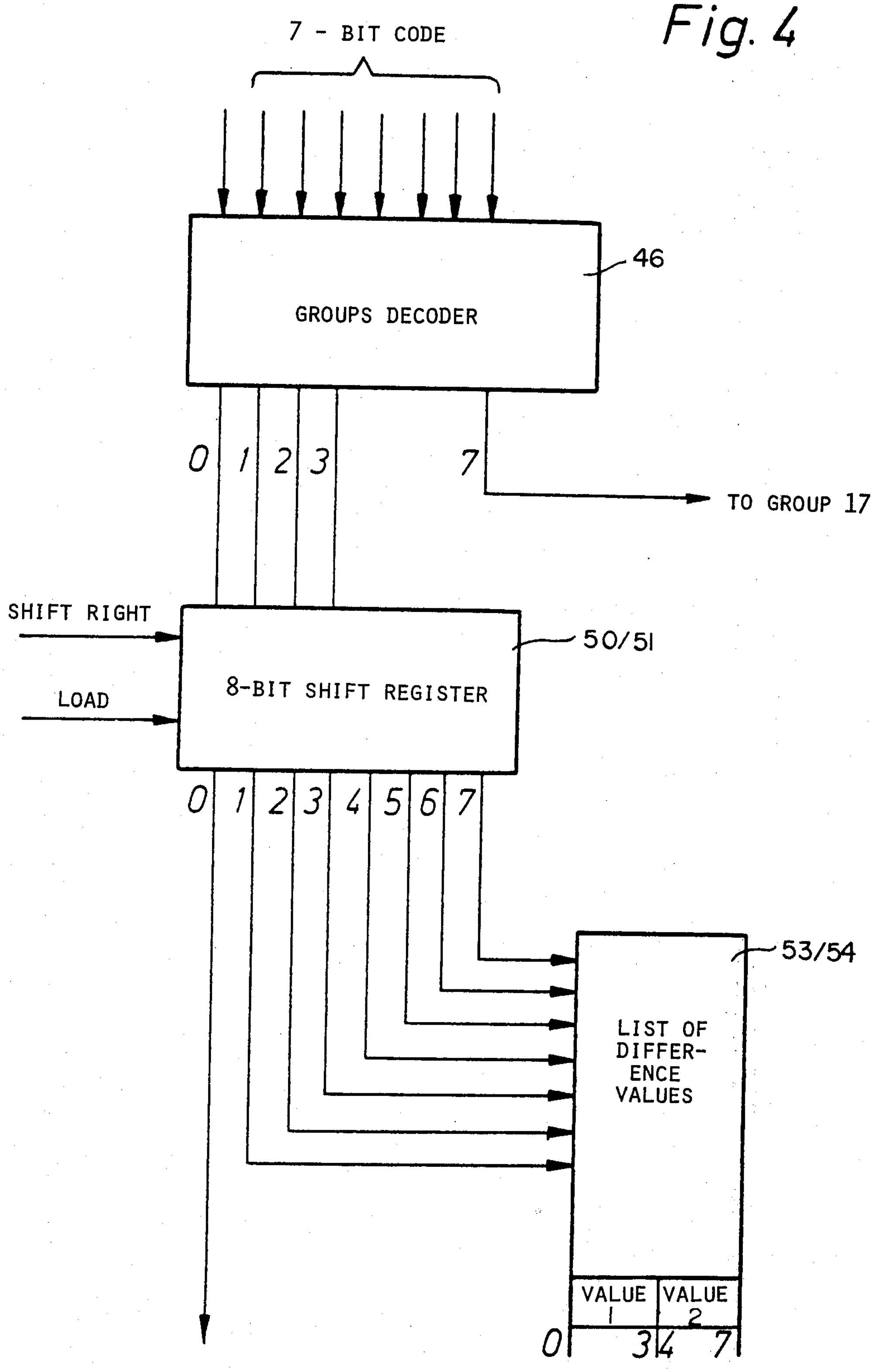
FIG. 4 is a schematic representation of the electronic means by which the matrix distribution and control of the different values for the letter combinations is possible.

As shown in FIG. 4 in connection with FIG. 1, the present process is realized by means of a groups decoder, a shift register, and a memory, which stores the table of difference values.

The 7-bit code, according to FIG. 4, coming from a not disclosed working register and which renders possible the identification of each character, is provided to the groups decoder 46, which out of the totality of all characters collates the characters of the groups 1 through 17 up to a maximum of 128 in the exemplary example under consideration. Groups decoder 46 can comprise both a PROM as well as a RAM memory. As shown, the character code appears as an address on the input side of groups decoder 46 and it forms four output channels in the instance in which the character or similar symbol under consideration belongs to the matrix groups 1 through 16 and an output channel 7 for the group 17 whose characters comprise those not participating in the running width correction. In other words, bits 0 through 3 give the group in the matrix, while bit 7 determines classification to the group 17. The bits 0 through 3 of the group decoder, after decoding of the first character in the case where this does not belong to the group 17, are supplied in parallel in the 8-bit shift register 50/51 thus to load the shift register in parallel. The shift register has a total of eight parallel outputs 0' through 7'. After decoding of the second character, the stored first character value is displaced in the shift register to the right by 4 bits and subsequently the bits 0 through 3 of the groups decoder again load the second 4 bits of the shift register.

An 8 bit long binary value is then queued in the outputs of the shift register, which serves as an address in the memory for the difference values. The memory forming the list of the difference values is sized at 128 bytes, wherein 1 byte=8 bits so that this list represents from the practical standpoint the entire contents of the matrix having 16 by 16 rows and columns. One byte contains two matrix register places which serves as a further reduction. The lowest value bit of the shift register indicates which part of the byte is meant in each case as indicated by block 52 in FIG. 1.

I claim:

1. A process for running width adjustment of adjacently positioned characters in a photocomposing machine to enhance the visual impression of the composed material, said process comprising the steps of:

assigning the characters of a font into a plurality of groups in accordance with their suitability for running width adjustment;

establishing the possibility and amount of running width adjustment to be provided for each combination of adjacently positioned character groups;

determining the running width of each character to be photocomposed, subjecting the characters to be photocomposed to classification into the aforesaid groups;

ascertaining, by reference to the group of the first character and the group of the second character of an adjacently positioned pair, the amount of running width adjustment to be provided; and applying the adjustment to the running width of one of the adjacently positioned characters.

2. The process according to claim 1 wherein the determination of the running width of each character is further defined as determining the running width of each character responsive to thickness of the character, the type face, and the type size.

3. The process according to claim 1 wherein the application of the running width adjustment is further defined as applying the adjustment to the first character of the adjacently positioned pair.

4. The process according to claim 1 wherein the application of the running width adjustment is further defined as reducing the running width of the first character of the adjacently positioned pair.

5. The process according to claim 1 wherein the assignment of the characters is further defined as assigning the characters into seventeen groups, sixteen of which contain characters that participate in running width adjustment and one of which contains characters that do not participate in running width adjustment.

6. The process according to claim 5 wherein the character assignment is further defined as assigning the characters participating in running width adjustment into sixteen groups each identified by a binary encoded number.

7. The process according to claim 6 wherein the character assignment is further defined as assigning the characters into sixteen groups each identified by a four bit binary encoded number.

8. The process according to claim 7 wherein the running width adjustment ascertainment is further defined as ascertaining the amount of running width adjustment by means of the binary encoded numbers of the first and second character groups.

9. The process according to claim 8 wherein the running width adjustment ascertainment is further defined as ascertaining the amount of running width adjustment by means of an 8 bit binary encoded number formed of the 4 bit binary encoded numbers of the first and second character groups.

10. The process according to claim 9 wherein 256 possible combinations of running width adjustment are established, wherein the combinations are stored in 128 bytes each identifying two running width adjustment amounts and wherein one bit of the 8 bit binary encoded number selects the proper adjustment amount.

* * * * *